United States Patent [19]
Panza

[11] 3,980,912
[45] Sept. 14, 1976

[54] SILENCER FOR A FAN-COOLED ELECTRIC MOTOR

[75] Inventor: Michael J. Panza, Erie, Pa.
[73] Assignee: Lord Corporation, Erie, Pa.
[22] Filed: May 27, 1975
[21] Appl. No.: 581,311

[52] U.S. Cl. .............................. 310/51; 181/33 K
[51] Int. Cl.² ............................................ H02K 5/24
[58] Field of Search .................. 310/58, 57, 89, 91,
    310/53, 66, 51, 88, 272, 273, 62, 63; 181/50,
    33 K, 61, 62; 248/26, 15, 20; 74/573, 574;
    336/100

[56] References Cited
UNITED STATES PATENTS

| | | | |
|---|---|---|---|
| 2,505,854 | 5/1950 | Curzon | 181/33 K |
| 2,838,262 | 6/1958 | Anderson | 248/26 |
| 2,874,008 | 2/1959 | Orte | 310/51 |
| 2,881,337 | 4/1959 | Wall | 310/51 |
| 3,161,013 | 12/1964 | Siefert | 181/33 K |
| 3,213,304 | 10/1965 | Landberg | 310/53 |
| 3,232,371 | 2/1966 | Reichert | 181/33 K |
| 3,527,969 | 9/1970 | Papst | 310/51 |
| 3,584,469 | 6/1971 | Butts | 310/51 |
| 3,748,507 | 7/1973 | siebert | 310/58 |

FOREIGN PATENTS OR APPLICATIONS

| | | | |
|---|---|---|---|
| 2,000,236 | 7/1971 | Germany | 310/51 |
| 1,909,264 | 9/1970 | Germany | 310/51 |

OTHER PUBLICATIONS
"Spencer Air-Noise & Motor Silencers" Spencer Turbine Co., Bulletin No. 300, pp. 6+7.

*Primary Examiner*—R. Skudy
*Attorney, Agent, or Firm*—Maurice R. Salada

[57] ABSTRACT

An electric motor has a motor housing and a fan at one end of the housing driven by the motor. The motor also has structure for directing air exhausted from the fan along the length of the motor housing to cool the motor. A silencer for the motor comprises an acoustical end panel disposed transversely of the motor housing and spaced axially from the end of the housing where the fan is mounted. A second acoustical panel is configured to define an open-ended member that at least partially surrounds the motor housing and is spaced from the housing. Each panel includes a layer of air-permeable sound absorbing material and an air-impermeable sheet disposed adjacent to the sound absorbing material on the side of the material opposite the motor housing. Air drawn in by the fan first passes radially inwardly of the motor housing along the end panel. Air exhausted from the fan passes between the second acoustical panel and the motor housing.

10 Claims, 2 Drawing Figures

SILENCER FOR A FAN-COOLED ELECTRIC MOTOR

BACKGROUND OF THE INVENTION

Electrical motors for industrial use often have housings or frames that totally enclose the motor winding and armature areas. While a housing protects an electric motor when exposed to environments contaminated with moisture or dust, for example, a cooling fan and specially designed housing surfaces are necessary to carry away heat transmitted to the housing by the electrodynamically operating components of the motor. In one construction of such a fan-cooled motor, the motor housing is generally cylindrical and the fan is mounted at the end of the housing opposite the main drive shaft from the motor. For safety and to ensure proper air flow, a cup-like cap or "bell" is fitted over the fan and the adjacent end of the motor housing. The fan draws air in through a grille in the center of the cap and exhausts the air along the length of the motor housing between the housing and the sides of the cap. A plurality of cooling fins project from and extend lengthwise of the motor housing to improve the cooling of the motor.

As the fan blades rotate to produce the required air flow, the noise emanating from the motor increases beyond the level normally generated by the motor itself. The additional noise is caused by air flowing through various passages about the motor housing and by the movement of the fan blades. To maintain the noise level within acceptable limits, the fan inlets for air-cooled electric motors can be provided with silencers. A typical silencer is a cylindrical member incorporating sound absorbing material and mounted to extend axially away from a fan inlet. Air is drawn into the silencer either axially or radially and then flows axially through the silencer to the fan. Such silencers are manufactured commercially by The Spencer Turbine Company of Hartford, Connecticut, for example. Other silencing devices incorporating sound absorbing material are described and illustrated in Guthrie U.S. Pat. No. 2,056,517 and Curzon U.S. Pat. No. 2,505,854.

Another type of silencer for a fan-cooled electric motor is described and illustrated in Wall U.S. Pat. No. 2,881,337. In the Wall device, which does not utilize sound absorbing material, the end cap or "bell" of an electric motor is replaced with a combination cap or casing and muffler. The combination member has a cylindrical shell and is internally partitioned into a pair of resonant chambers. The chambers both have central openings axially aligned with the motor frame or housing. The cooling fan for the motor draws in air axially through the resonant chambers and discharges the air along the exterior surface of the motor housing. In one embodiment, the shell of the combination member extends the full length of the motor and terminates in a resonant-type muffler to attenuate the noise from the discharge of the cooling fan. As is suggested by the patent, such a resonant-type muffler is effective for only a limited and predetermined range of frequencies.

SUMMARY OF THE INVENTION

The present invention relates to a compact silencer for a fan-cooled electric motor which effectively attenuates the noise generated by the cooling fan and emanating from its air inlet. The silencer also attenuates the noise emanating from the exhaust of the cooling fan and can be utilized on existing fan-cooled electric motors without modifying their basic structure. A fan-cooled electric motor with which the invention is to be utilized has a motor housing and a fan at one end driven by the motor. The motor also has structure for directing the air exhausted from the fan along the length of the motor housing to cool the motor. A silencer according to the present invention comprises an acoustical end panel disposed transversely of the longitudinal axis of the motor housing and spaced from the end of the housing at which the fan is mounted. A second acoustical panel is configured to define an open-ended member that at least partially surrounds the motor housing and is spaced from the housing. Each panel includes a layer of air-permeable sound absorbing material and an air impermeable sheet disposed adjacent to the sound absorbing material on the side of the material opposite the motor housing. Air that is drawn in by the fan passes radially inwardly of the motor housing along the acoustical end panel. Air exhausted from the fan passes between the second acoustical panel and the motor housing. The sound absorbing material of the acoustical end panel directly absorbs noise propagated axially of the cooling fan toward the end panel. Noise propagated radially of the fan is attenuated because the end panel acts as a dissipative silencer along the radial path of the sound. Similarly, the second or side acoustical panel acts as a dissipative silencer for noise propagated axially of the fan and traveling along the motor housing.

The term "dissipative silencer" refers to a device which "absorbs" sound traveling parallel, rather than perpendicular, to the surface of the device. The functioning of such a silencer can be visualized by considering the alternating compression and rarefaction of air which is the physical embodiment of sound. As successive compression waves are propagated parallel to the sound absorbing material, each wave spreads out and a part of the wave enters the material. Within the sound absorbing material, the kinetic energy of the air molecules making up the compression wave is dissipated in heat. Thus, the total energy in the compression wave is reduced and less energy is available to be transferred to the surroundings as sound.

In a preferred embodiment of the silencer of the present invention, the structure that directs the air from the fan along the motor housing includes a cap or cover surrounding the motor housing adjacent the fan. The cap is dimensioned such that its sides are spaced from the motor housing and extend only part way along the length of the housing. One end of the cap is closed and defines a grille disposed between the fan and the acoustical end panel. Air drawn in by the fan thus flows through the grille after passing between the acoustical panel and the peripheral edges of the cap.

The preferred embodiment of the silencer also includes a perforate sheet for each acoustical panel disposed between the sound absorbing material and the motor housing. Both acoustical panels are mounted on the end cap of the motor and utilize mineral wool as the sound absorbing material.

BRIEF DESCRIPTION OF THE DRAWING

For a better understanding of the invention, reference may be made to the following description of an exemplary embodiment, taken in conjunction with the figures of the accompanying drawing, in which.

DESCRIPTION OF AN EMBODIMENT

Figure 1:
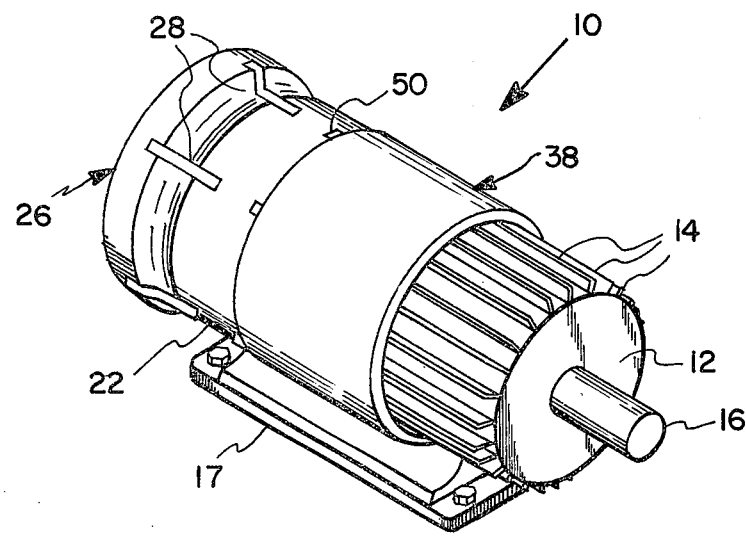
FIG. 1 is a perspective view of a fan-cooled electric motor having a silencer according to the present invention.

FIG. 1 of the drawings illustrates, in perspective, an electric motor, generally designated 10. The motor 10 has a generally cylindrical motor housing or frame 12 with a plurality of cooling fins 14 projecting radially from the housing and extending lengthwise along the housing. At one end of the motor housing 12, a drive shaft 16 projects from the housing along its center line and may be used to drive a pulley wheel or other conventional drive train (not shown). The housing 12 is mounted on a base 17 that may be bolted to a supporting surface.

Figure 2:
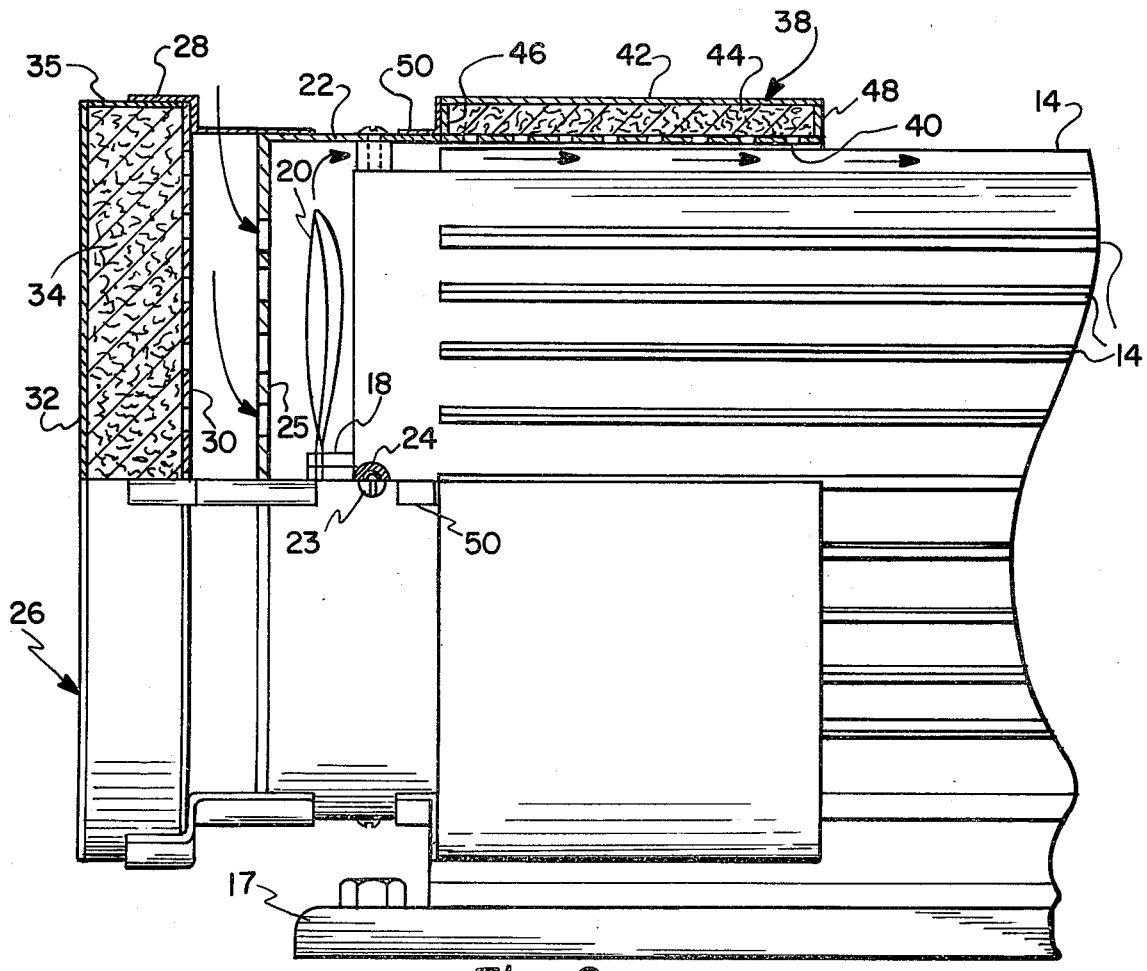
FIG. 2 is a side view, partly in section, of the electric motor of FIG. 1.

At the end of the motor housing 12 opposite the shaft 16, as best shown in FIG. 2, is a second shaft 18 on which is mounted a cooling fan 20. The fan 20, which is driven by the motor 10, draws air from the left in FIG. 2 and exhausts the air to the right in FIG. 2. For safety and to ensure proper air flow from the fan 20, a cup-like end cap or bell 22 is mounted over the fan and the adjacent end of the motor housing 12. The cap 22 has a larger diameter than the motor housing 12 so that the sides of the cap are spaced radially from the housing. The cap 22 is mounted on the motor housing 12 using screw-type fasteners 23, for example, and annular spacer elements 24 of an appropriate length to maintain a constant annular space between the cap and the motor housing. One end of the cap 22 is closed and defines a grille 25 that lies generally parallel to the fan 20 and the adjacent end of the motor housing 12. The grille 25 acts as an air inlet for the fan 20, while the annular space between the sides of the cap 22 and the motor housing 12 provides an outlet for the air exhausted by the fan. The cap 22 thus guides the air exhausted from the fan 20 along the length of the motor housing 12 between the cap and the housing to flow over the cooling fins 14.

To attenuate the noise generated by the fan 20 and the related air flow, an acoustical panel 26 is positioned transversely of the longitudinal axis of the motor housing 12 adjacent the fan 20. The panel 26 is planar and generally circular in shape, projecting radially beyond the end cap 22 approximately one inch about most of the periphery of the cap. In the illustrated embodiment, the panel 26 is spaced approximately two inches from the grille 25 of the end cap 22 and is oriented parallel to the grille. Four or five Z-shaped metal tabs 28, which are spaced about the circumference of the circular panel 26 and the end cap 22, mount the panel on the end cap. The tabs 28 are secured to the panel 26 and the end cap 22 by welding, adhesive, screw fasteners or any other suitable technique. The panel 26 may also be mounted on the end cap 22 using bolts that pass through the panel and are screwed into threaded holes in the end cap.

The panel 26 comprises a circular sheet of perforated, 22-gauge, galvanized sheet steel 30, which is presented to the grille 25. Spaced from the perforated sheet 30 and the parallel to it is a solid sheet of 16-gauge, galvanized steel 32. A 2-inch thick layer of mineral wool 34, which is permeable to air, is disposed between the sheets 30 and 32 and acts as a sound absorbing material. The sheets 30 and 32 are joined together by an annular flange 35 that extends about the periphery of the panel 26. The flange 34 is solid galvanized sheet steel and may be an integral part of the sheet 32, with the sheet 30 welded, for example, to the flange. The flange 34 may also be a separate element subsequently welded or otherwise secured to both sheets 30 and 32.

Adjacent the open end of the cap 22, a second arcuate acoustical panel 38 partially encircles the motor housing 12. The panel 38 defines only a part of an annulus because of the base 17. The panel 38, like the panel 26, has an inner annular sheet of perforated, galvanized steel 40 and an outer, larger diameter, annular sheet of solid, 16-gauge galvanized steel 42. The two sheets 40 and 42 are separated by a one inch thick layer of mineral wool 44 and are joined together by a pair of annular flanges 46 and 48. The flanges 46 and 48 may be integral portions of the sheet 42 or they may be separate elements. Any joints between the metal members 40, 42, 46 and 48 of the panel 38 may be sealed by welding, adhesive or any other conventional fastening technique. The annular panel 38 is mounted on the cap 22 by four or five L-shaped metal tabs 50. The tabs 50 are spaced about the circumference of the panel 38 and are secured to the panel 38 and the cap 22, by welding, screw fasteners or adhesive, for example.

As can be seen from the upper, left-hand portion of FIG. 2, sound emanating axially from the fan 20 may pass through the perforations in the sheet 30 and be absorbed in the layer of mineral wool 34. Sound that is propagated radially of the fan, including sound that may be reflected from the end panel 26, travels between the panel 26 and the end of the cap 22. During such radial travel of the sound waves, the panel 26 acts as a dissipative absorber and reduces the level of the noise before it radiates beyond the edge of the acoustical panel 26.

As can be seen in the upper, right-hand portion of FIG. 2, the annular acoustical panel 38 extends along the length of the motor housing 12 beyond the end of the cap 22. The panel 38 acts as a dissipative absorber, like the panel 26 with relation to radially propagated sound, to absorb a portion of the sound that is traveling parallel to its perforated surface 40. As shown, the length of the panel 38 is approximately 8 inches, while the diameter of the panel 26 is approximately 24 inches and the length of the cap 22 is roughly 5 inches. Each dimension will vary with the size of the motor, specifically, the motor housing, with which the silencer is used. The length of the panel 38 may also be varied, either lengthened or shortened, as necessary to achieve a desired level of sound emanating from the motor 10. Use of the panel 38 only slightly restricts the flow of air from the exhaust of the fan 20 along the outer surface of the motor housing 12. As should be apparent, the panel 38 is intended primarily to attenuate noise generated at the outlet of the fan 20, while the panel 26 is intended to attenuate noise generated at the fan inlet.

It will be understood that the embodiment described above is merely exemplary and that persons skilled in the art may make many vatiations and modifications without departing from the spirit and scope of the invention. Such modifications may include variations in the thicknesses of the layers of sound absorbing material, use of different types of sound absorbing material and changes in the thicknesses and material of the sheets used in the acoustical panels. All such modifications and variations are intended to be within the scope of the invention as defined in the appended claims.

What is claimed is:

1. In an electric motor having a motor housing, a fan at one end of said housing driven by the motor, and means for directing air exhausted from the fan along the length of the motor housing to cool the motor, the air directing means including a cap which surrounds the motor housing adjacent said one end of the housing and which has sides that are spaced from and extend only part way along the length of the motor housing, the improvement of a silencer comprising:
   a. an acoustical end panel disposed transversely of the longitudinal axis of the motor housing and spaced axially from said one end of the housing and the fan; and
   b. an acoustical side panel configured to define an openended member at least partially surrounding the motor housing, said side panel being mounted at one end on the cap adjacent an end of the cap closest to the other end of the housing, said side panel also being spaced from the motor housing and extending beyond the cap at least part way along the length of the housing,
   each acoustical panel including a layer of air-permeable sound absorbing material and an air-impermeable sheet disposed adjacent to the sound absorbing material on a side thereof opposite the motor housing, air drawn in by the fan passing radially inwardly of the longitudinal axis of the motor housing along the acoustical end panel and the air exhausted by the fan passing between the motor housing and the acoustical side panel.

2. An electric motor, according to claim 1, wherein one end of the cap is closed and defines a grille disposed between the fan and the acoustical end panel.

3. An electric motor, according to claim 1, wherein the silencer also comprises means mounting the acoustical end panel on the cap.

4. An electric motor, according to claim 3, wherein the acoustical end and side panels are mounted only on the cap.

5. An electric motor, according to claim 1, wherein the motor housing is generally cylindrical in shape and the acoustical side panel defines a partial annulus in shape.

6. An electric motor, according to claim 1, wherein the sound absorbing material for each acoustical panel is mineral wool.

7. An electric motor, according to claim 1, where each acoustical panel also includes a perforate sheet disposed between the sound absorbing material and the motor housing.

8. An electric motor, according to claim 1, wherein the motor housing has a plurality of cooling fins projecting from the housing and extending lengthwise of the housing.

9. An electric motor, according to claim 1, wherein the acoustical end panel is the only acoustical panel which is both disposed transversely of the longitudinal axis of the motor housing and along which passes air drawn in by the fan.

10. In an electric motor having:
   a. a generally cylindrical motor housing with a plurality of cooling fins projecting radially from the housing and extending lengthwise of the housing;
   b. a hollow, cylindrical end cap fitting over one end of the motor housing and encircling the housing adjacent said one end, the end cap being dimensioned to extend only part way along the length of the housing and to be spaced radially from the housing, one end of the end cap being closed and defining a grille covering said one end of the motor housing; and
   c. a fan at said one end of the motor housing driven by the motor, the fan being disposed between the grille in the end cap and said one end of the motor housing and being adapted to draw air through the grille and to exhaust said air along the length of the motor housing between the housing and the end cap,
   the improvement of a silencer comprising:
   d. a first acoustical panel disposed transversely of the longitudinal axis of the motor housing parallel to and spaced from the grille on a side thereof opposite the fan, the air that is drawn in by the fan flowing radially inwardly of the motor housing between the first acoustical panel and the end cap;
   e. means mounting the first acoustical panel on the end cap; and
   f. a second acoustical panel at least partially encircling the motor housing adjacent an open end of the end cap opposite its closed end and being mounted at one end on the cap, adjacent its open end the second acoustical panel being spaced radially from the motor housing and extending lengthwise of the housing beyond the end cap so that air exhausted by the fan passes between the motor housing and the second acoustical panel,
   the first and second acoustical panels each including a perforate sheet presented to the motor housing, an air-impermeable sheet oriented parallel to and spaced from the perforate sheet on a side thereof opposite the motor housing, and a layer of air-permeable sound abosorbing material disposed between the perforate sheet and the air-impermeable sheet.

* * * * *